United States Patent [19]

Van Heel

[11] 3,761,885

[45] Sept. 25, 1973

[54] COMPUTER SYSTEM COMPRISING A STORAGE CONFIGURATION WITH ACCESS PRIOR TO ULTIMATE ADDRESS CALCULATION

[75] Inventor: Jean Joseph Marie Dudok Van Heel, Beekbergen, Netherlands

[73] Assignee: U.S. Philips Corporation, New York, N.Y.

[22] Filed: Feb. 16, 1972

[21] Appl. No.: 226,917

[30] Foreign Application Priority Data

Feb. 20, 1971 Netherlands .......................... 7102289

[52] U.S. Cl. .............................................. 340/172.5

[51] Int. Cl. .............................................. G11c 7/00

[58] Field of Search ................................. 340/172.5

[56] References Cited

UNITED STATES PATENTS

| | | | |
|---|---|---|---|
| 3,317,902 | 5/1967 | Michael | 340/172.5 |
| 3,395,392 | 7/1968 | Kulikauskas et al. | 340/172.5 |
| 3,401,376 | 9/1968 | Barnes et al. | 340/172.5 |
| 3,461,433 | 8/1969 | Emerson | 340/172.5 |
| 3,553,653 | 1/1971 | Krock | 340/172.5 |
| 3,569,938 | 3/1971 | Eden | 340/172.5 |

*Primary Examiner*—Paul J. Henon
*Assistant Examiner*—James D. Thomas
*Attorney*—Frank R. Trifari

[57] ABSTRACT

In order to allow a request for access to a given store in a computer system having a storage configuration comprising a number of stores to be made before an ultimate address has been calculated from a number of address components, an unused address space (void) is defined between each store of the configuration and possibly also above the store of the highest order. A result of an address calculation which is situated in a void causes a cancellation of the relevant previously made request for access. It will never be necessary to change a request for access to a given store into a request for access to another store.

3 Claims, 9 Drawing Figures

COMPUTER SYSTEM COMPRISING A STORAGE CONFIGURATION WITH ACCESS PRIOR TO ULTIMATE ADDRESS CALCULATION

The invention relates to a computer system comprising a storage configuration consisting of at least one first store having a first address space of $2^l$ possible word locations and a second store consisting of $2^m-1$ ($m \geq 1$) modules, which together comprise a second address space, and furthermore comprising at least one calculating unit in which addresses of possible word locations in the storage configuration can be calculated on the basis of at least two address components.

In a computer system comprising a storage configuration of this kind, having a plurality of processing stores, accesses can be effected to two or more of the processing stores of the storage configuration at the same instant by a number of portions of the system, for example, by one or perhaps more central processors and/or one or more I/O channels. The requests for an access of this kind to a correct store at a correct instant may give rise to problems. In order to ensure that the accesses to the stores are effected consecutively without loss of time, it is necessary to make the requests for the accesses to the stores at an early instant. If this is done, the use of the computer makes it possible to ensure that requests for access to the correct stores are dealt with in the correct sequence, for example, in accordance with their priority, within the correct time and also as efficiently as possible. In practice, one or more complete or partial address components of an address to be composed are often known earlier than the complete address, which becomes known only after an address calculation, for example, an addition, has been performed. The fact that complete or partial address components are already known at an early instant can be used to good advantage for making a request for access to a given store of the configuration. The invention has for its object to provide a simple solution for making these early requests for access, difficulties in the addressing of the stores being precluded. In order to achieve this, the computer system comprising the said storage configuration is characterized in that detectors are provided in which, before the result of a said address calculation is known, it can already be determined, on the basis of at least a portion of at least one of the address components, for which of the stores a request for access is required. The detectors then supply a relevant request signal. In order to avoid that a request signal for access to one of the stores would have to be changed, on the basis of the ultimate result of an address calculation, into a request signal for access to another store of the storage configuration, unused addresses are present at least between the addresses of the address space of the first store and the addresses of the address space of the second store. The unused addresses not being used by the storage configuration and forming an unused address space, are called void, the capacity of the unused address space being $2^{l+p}-2^l$ addresses, $p$ being at least 1 and being further determined by the number of times that a module of the second store is larger than the address space $2^l$ of the first store. Further means are provided which, if the ultimate result of an address calculation is an address of said unused address space, this address is signalled and an error signal is supplied there with. If the result of said address calculation were to make it necessary to change a request for access to a given store into a request for access to another store, a considerable amount of time would be lost and the correct handling of previously or slightly later made requests for access to given stores would no longer be ensured.

In order to make the foregoing applicable to a computer system having a storage configuration consisting of a number of $N$ stores, it is necessary according to the invention that between each of the stores, $I$ and $J$ of the $N$ stores a said unused address space is provided, the capacity of which is $2^{\Sigma Li+pj}-2^{\Sigma Li}$ addresses, $2^{\Sigma Li}$ being the total number of addresses of all preceding address spaces of the preceding stores 1 to $I$ inclusive, and the addresses of the unused address spaces situated therebetween, $pj$ being at least 1 and being further determined by the number of times that a module of the store $J$ is larger than the total address space formed by the address spaces of all preceding stores and the unused address spaces situated therebetween.

Furthermore, according to an extension of the invention it is also possible in given cases, if there is space left in the length of the addresses which may be produced as the result of an address calculation, that another said unused address space is present above the store $N$ of the highest order, the capacity of this unused address space being $2^{\Sigma Ln+n}-2^{\Sigma Ln}$ addresses, $2^{\Sigma Ln}$ being the total number of addresses of all preceding address spaces of the preceding stores 1 to $N$ inclusive, and the addresses of the unused address spaces situated therebetween, $n$ being at least 1.

In order that the invention may be readily carried into effect, some embodiments thereof will now be described in detail, by way of example, with reference to the accompanying diagrammatic drawings, in which:

FIG. 1 is an example of a possible diagram of the construction of the computer system according to the invention.

FIGS. 2*a*, *b*, *c*, show three examples of an address calculation, FIGS. 2*b* and *c* showing examples according to the invention.

FIGS. 3*a*, *b*, *c* show three numerical examples of an address calculation in a computer system according to the invention.

Figure 1:
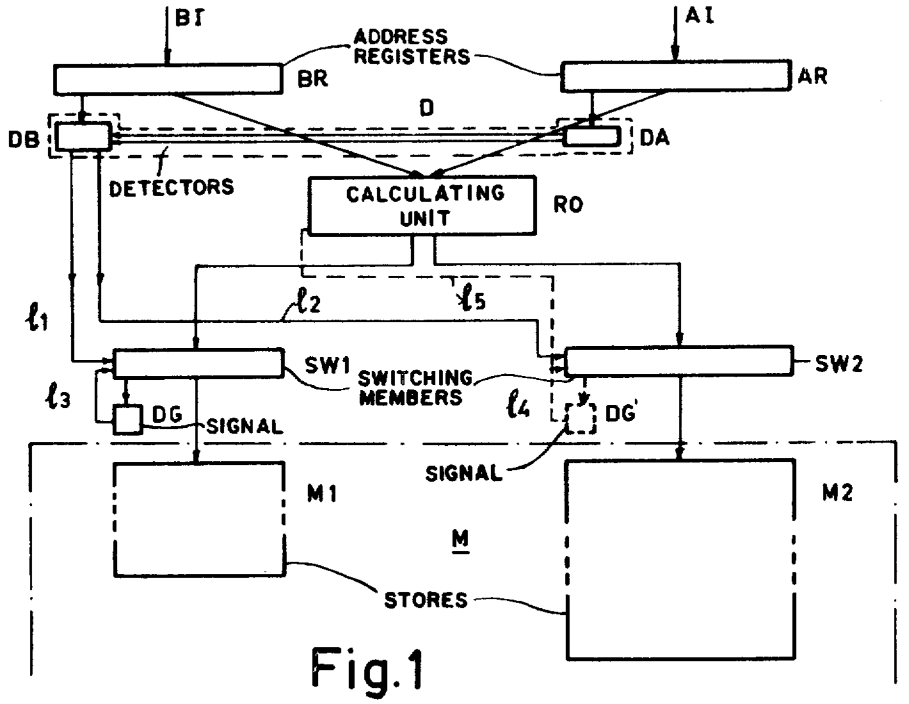

In FIG. 1, the letters AR denote a register for an address component A, BR is a register for an address component B. The letters AI and BI denote inputs of these registers, via which the address components from other parts of the computer system, shown here only as far as is necessary for explaining the invention, can be applied to the registers AR and BR. Additional registers for address components may be present, but these are not shown as they have no bearing on the principle. Calculations with the address components A and B, for example, an addition, can be performed in a calculating unit RO. SW1 is a switching member via which addresses for a store M1, said addresses originating from the calculating unit RO, can be applied to the store M1. Similarly, SW2 is a switching member via which addresses for a store M2, originating from RO, can be applied to the store M2. M1 and M2 are stores of the storage configuration M of the computer system. Requests for access to a store M1 or M2 are applied to the relevant switching member SW1 or SW2. According to the invention, the computer system shown in FIG. 1 comprises detectors D, which in this case consist of a portion DA and a portion DB, in which, as is shown by way of example, it can be determined, on the basis of a portion of the address component A or B, for which of the stores M1 or M2 a request for access is necessary. If a request is necessary for M1, a command line *l1* supplies a request signal to the switching member SW1, and if a request is required for M2, a command line *l2* supplies a request signal to the switching member SW2. In the system it can thus be taken into account that, after an address calculation in the calculating unit RO, an access to the store M1 or M2 is required. Finally, FIG. 1 also shows an indicator DG which are in this case connected to the switching member SW1 and in which it is signalled that the ultimate result of an address calculation is an address of said unused address space. A signalling of this kind in DG ensures, in this example via line *l3*, that the associated and previously made request is cancelled in the switching member SW1. A signalling of this kind generally supplies an error signal to the computer system to indicate that something is wrong. Similarly, a means DG' may be provided which is connected to the switching member SW2 and in which it is signalled that the ultimate result of an address calculation is an address of the unused address space which may be present above the store M2 which is of the highest order in this case. A signalling of this kind produces an error signal via line l4, which is now applied, for example, to the switching member SW2 so that the relevant, previously made request for store M2 is cancelled. DG' may also serve for a given other signalling, which will be described with reference to FIG. 2b. Finally, instead of or in addition to DG', there may be a command line *l5* which can cancel, from the calculating unit RO, a request for store M2; see also the description with reference to FIG. 2b.

Figure 2:
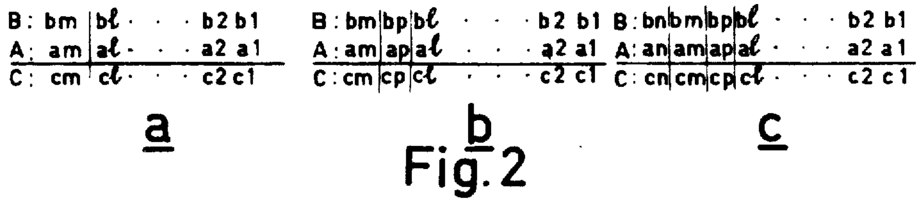

The operation will be described with reference to the FIGS. 2. It is to be noted that in FIG. 1, for example, the detector DA of D may be dispensed with if the addressing structure in the computer system is such that only the address component B determines to which of the stores of M a request is to be made. It can thus be determined at an early stage, on the basis of the address component B, which store this will be. See hereinafter.

The principle of the invention will be described with reference to three examples of address calculations which are shown in FIGS. 2*a*, *b*, *c*.

FIG. 2*a* shows an address component B comprising address bits *bm*, *bl*, . . . *b*2, *b*1, and an address component A comprising address bits *am*, *al*, . . . *a*2, *a*1.

Addition of the two address components B and A results in an address C. C comprises address bits *c*1, *c*2, . . . *cl*, *cm*. Assume that the bits *bm* and *am* are portions of the address components B and A, on the basis of which it can be determined, before the result C is known, for which store M1 or M2 a request for access is required. Assume that a request for store M1 is required when *bm* and *am* are both equal to O. The O-state of *bm* is detected in DB, that of am in DA. An AND-function gate (not shown) provided, for example, in DB, then supplies a signal to line *l1*. A request for store M1 has thus been made to switching member SW1. For example, if one of the two bits *bm* or *am* were 1, this would have been signalled in DB or DA and in that case an OR-function gate (not shown) provided, for example, in DB, would supply a signal to line *l2*. A request for store M2 has thus been made to switching member SW2.

The following may occur if *bm* = *am* = 0: upon addition of the components B and A a transfer occurs from bit *cl* to *cm*, i.e., *cm* becomes 1. This means that the result is an address which is not situated in store M1 but in store M2. Consequently, the request for store M1 would have to be changed into a request for store M2. According to the invention this is not permissible and, therefore, an address structure as shown in FIG. 2*b* is chosen. Therein, component B comprises an additional bit *bp* and component A comprises an additional bit *ap*. In this case, a request for access to store M1 will be produced when *bm* and *bp* as well as *am* and *ap* are 0. If a transfer occurs from *cl* to *cp* in the formation of the result C, *cp* becomes 1. This *cp* = 1 is signalled in DG', and this *cp* = 1 signal ensures that the request made via line *l1* for access to store M1 is cancelled. This is possible because *cm* is still equal to 0 so that the request for store M1 need not be changed into a request for store M2, In other words, the result of the calculation was an address C situated in an unused address space produced by the use of the bits *ap*, *bp*, *cp*. However, if *bm* or *am* = 1 in the example of FIG. 2*b* or, as may be the case in given address structures, either *bp* and/or *ap* = 1, it will be detected in D, i.e., in DB and/or DA, that a request for store M2 is required. The result C may then assume different forms: 1) *cm* = 1 and *cp* = 1 or 0, caused or not by a transfer from bit *cl*. This is a correct address in store M2 and the previously made request was justified; 2) in a feasible addressing structure *cm* may be 0 and *cp* may be 1, which again means that an address is produced in the used address space, so that the previously made request for store M2 is to be cancelled. This can be effected from the means DG', which signals in SW2 that *cm* = 0 and *cp* = 1, thus supplying a signal via line *l4*; 3) *cm* = 1 or 0, *cp* = 1 or 0, and a transfer occurs from *cm* (i.e., to the left). This means that an address is produced outside the total possible address space, which is determined by the number of bits *c*1 to *cm*. A transfer of this kind may, for example, "drop out of" the result register in the calculating unit, thus ensuring that a request made in SW2 for M2 is cancelled. See line *l5* in FIG. 1.

FIG. 2*c* shows that in the case of the latter transfer from bit *cm* another solution is possible: there is still an unused address space above the address space of store M2, which is denoted by bit *bn*, *an* and *cn*, respectively. If *bn* and/or *an* are 1 already prior to the address calculation, nothing need be calculated and there will be no request. However, a situation of this kind will be discovered and eliminated in the computer system at an earlier stage yet. If *cn* becomes 1 in an address calculation, due to a transfer from *cm*, this is signalled, for example, in DG', and the request for store M2 is cancelled via line *l4*.

FIGS. 3*a*, *b* and *c* show some further examples for the case shown in FIG. 2b. The following addressing structure is often used in practice: address component B is a basic address which indicates in principle in which of the stores a total address, being the sum of the basic address and an address component A, also termed, for example, logic address, will have to be found. Consequently, in that case the situation *bm* = 0, *bp* = 1, will not occur. It may be that a logic address is never longer than *l* bits (*a*1, *a*2, . . . *al*), so that *ap* and *am* always equal 0. Consequently, the following cases may occur:

FIG. 3*a*) $bm = bp = 0$, signalled in DB (DA is not necessary), results in a request signal for SW1, so for store M1.

The ultimate result C may be 00*cl* . . . , so an address in M1 (the request was correct), or 0/*cl* . . . due to a transfer, so an address in the unused address space. In this case $cp = 1$ is signalled in DG and the request is cancelled. FIG. 3*b*): $bm = 1$, $bp = 0$, so the basic address indicates that an access to store M2 is desired. A signal on line *l*2 from DB to SW2 provides a request for M2. The result C may be 10cl . . . or 11cl . . . , so in both cases a request for M2. FIGS. 3*c*): $bm = 1$, $bp = 1$, so again a request for M2. The result may be 11*cl* . . . , so this was a justified request for M2. Due to a transfer, the result may also be 00*cl* and another transfer to the left. This transfer may "drop out of" the calculating unit register, and may cancel the request in SW2 via line *l*5 (FIG. 1) or, if bits *an*, *bn* and/or only *cn* were present, this $cn = 1$ would be signalled in the DG' which is then provided, so that the request for M2 would thus be cancelled via *l*4.

Figure 3:
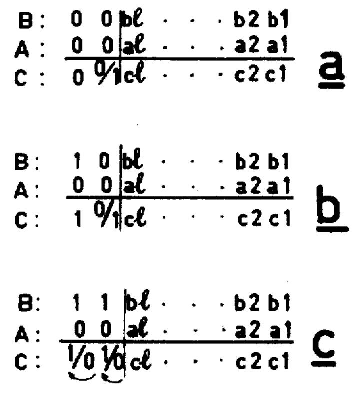

The following is to be noted as regards the various address spaces and their capacities. The store M1 comprises an address space which is determined by the number of *l* bits. The number of possible word locations, consequently, is $2^l$. In the examples of FIGS. 2 and 3, the store M2 has an address space which is determined by the number of bits $l+p+m$ (it was assumed that $p = 1$, $m = 1$). The number of possible word locations in M2, and hence the capacity of this address space of M2 is, therefore, $2^{l+p+m}-2^{l+p} = (2^m-1) \quad 2^{l+p}$, as the addresses $2^l$ of the address space for M1 and the addresses of the unused space situated between M1 and M2, comprising $2^{l+p}-2^l$ addresses, must be subtracted from the total $2^{l+p+m}$.

In general it may be stated that the number of bits *p* and also *n* must be at least equal to 1 in order to cope with the above mentioned transfer from *cl* or from *cm*, respectively. In addition, the store M2 may comprise $2^m-1$ modules having equally large address spaces. Consequently, the number of bits *m* is determined by the number of desired modules. If this number is three, $m = 2$ and the combinations 01, 10, 11 are reserved for distinguishing each of these three modules, while the remaining combination 00 is necessary for knowing that addressing is to take place in store M1 (see above).

The foregoing means that for addressing in one module of M2 a space of $2^{l+p}$ addresses is available, as one of the bits *m* is 1, and the further bits $l+p$ are then available for addressing in such a module. Because *p* is at least equal to 1, the capacity of such a module of M2 can at least be $2^{l+1}-2^l = 2^1$ = two times that of the store M1. If such a module is larger, for example, four times larger than store M1, *p* will have to be equal to 2 bits, etc.

Figure 4:
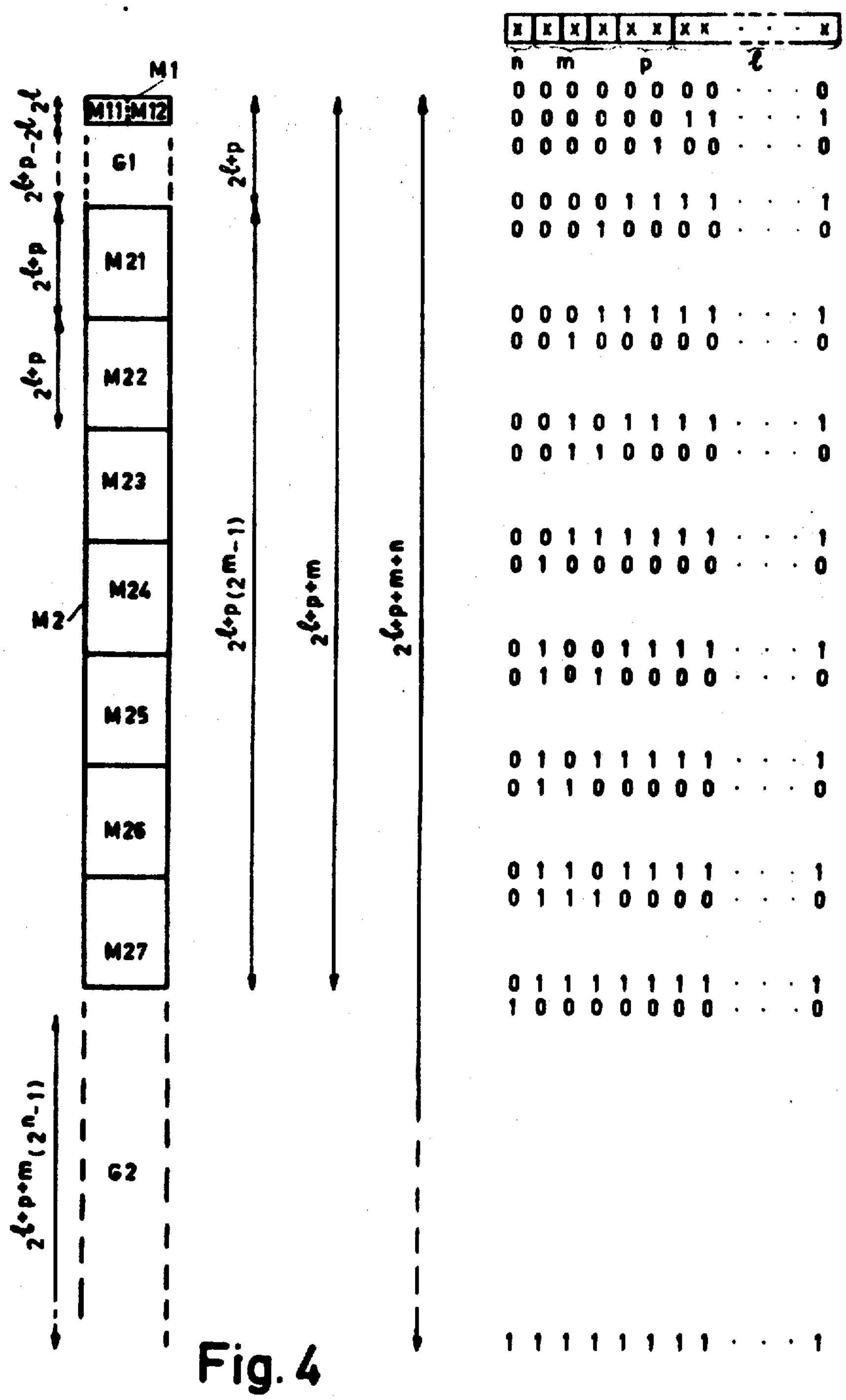
FIG. 4 is a diagram of a storage configuration used in a computer system according to the invention.

FIG. 4 shows an example of a storage configuration as used in a computer system according to the invention. M1 is a first store consisting of a first address space of $2^l$ possible word locations, M1 itself, may, of course, also be composed of modules M11, M12, etc. (see dotted line in FIG. 4), but this is of no further importance. M2 is a second store consisting a $2^m-1$ modules, $m = 3$, so seven modules, to-gether comprising a second address space of $2^{l+p}(2^m-1)$ possible word locations, $2^{l+p}$ word locations being available per module. In this example *p* equals two bits, as in this case, by way of example, a module M21, M22, . . . M27 of store M2 is $2^2$ = four times as large as the said first address space of M1. Also provided is the unused address space, void G1, between M1 and M2. The capacity thereof is $2^{l+p}-2^l = 2^l(2^p-1)$, so in this case $3 \times 2^l$ or three times as large as the first address space, which is the store M1. In total M1 and G1 are exactly as large ($2^{l+p}$) as one module of M2. So far the entire storage configuration comprises a total address space of $2^{l+p+m}$ addresses. If another unused address space, second "void" G2, is required above the store M2, it is at least as large as the entire address space of $2^{l+p+m}$ addresses formed thus far: i.e., $n = 1$. This $n = 1$ bit thus serves for coping with a transfer from the preceding address space. The address space ultimately comprises $2^{l+p+m+n}$ addresses.

The right-hand portion of FIG. 4 shows the appearance of the addresses for the various portions of the storage configuration, including the "voids". For each space: store M1, void G1, modules M21 . . . M27 of M2 and void G2, the minimum and the maximum address is stated. In the computer system according to the invention, the stores M1 and M2 may be of the same or of a different kind. If they are of the same kind, for example, magnetic cores, or integrated stores, the invention set forth can be advantageously used, if the access times of these stores differ. M1 is, for example, a comparatively slow store and M2 is, for example, a comparatively fast store. It then makes sense to split the requests for access to the one store and those for access to the other store. If the stores are of a different kind, not only a difference in access time but also the difference in operation of those stores is an argument for splitting up the requests for access and to distribute them over the various above-mentioned switching members SW.

It is feasible that in practice not two but, for example, four stores are to be distinguished in one and the same configuration. The solution is then fully analogous to that set forth for two stores M1 and M2, taking into account that each unused address space situated between a store I and a store J is to be at least as large as the total preceding address space ($2^{\Sigma L i}$ addresses) and is furthermore so many times larger than this total address space as a module of that store is larger than this total address space.

Figure 5:
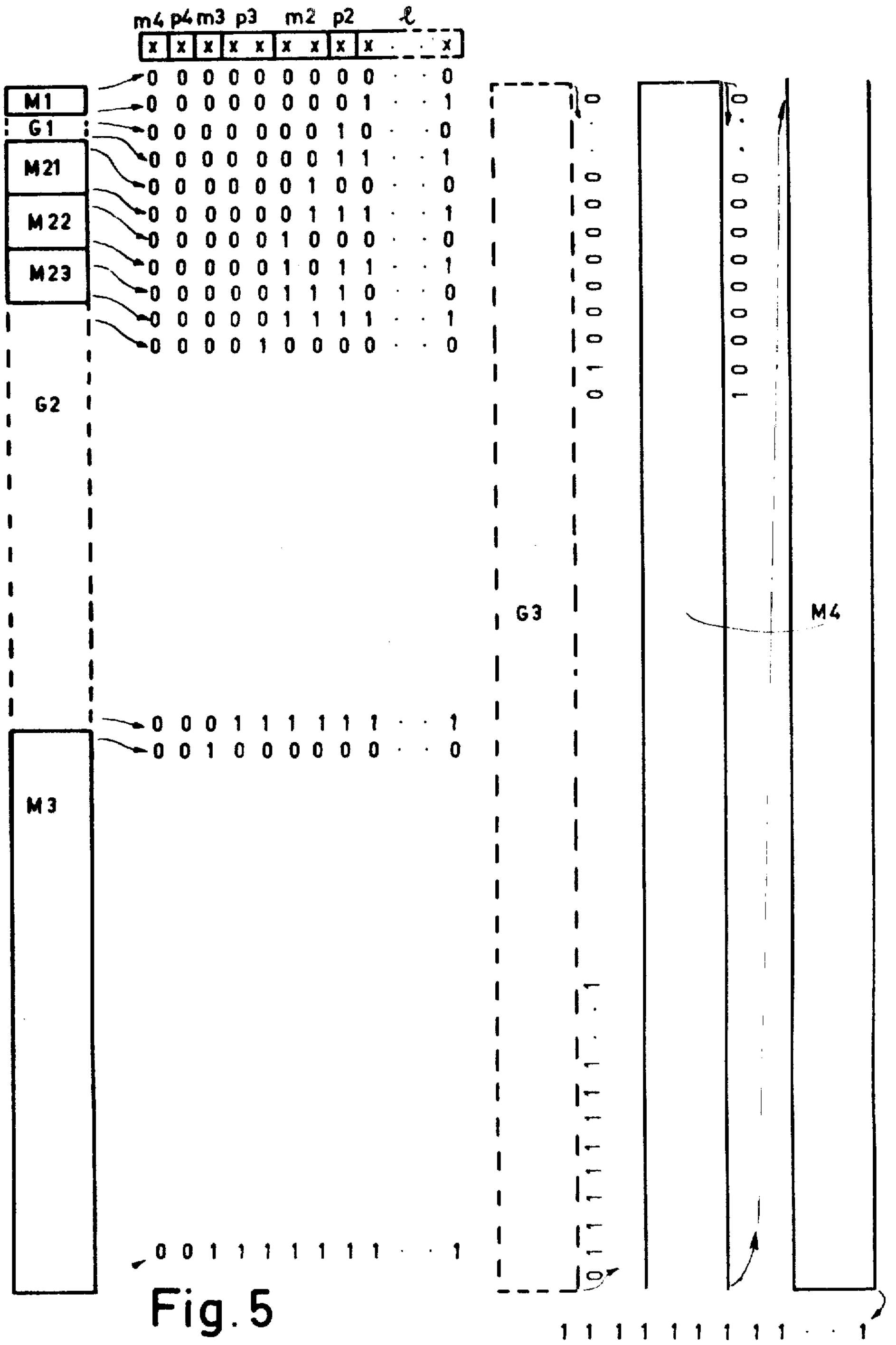
FIG. 5 shows another diagram of a storage configuration of this kind.

This is represented again in the form of a diagram in FIG. 5. The configuration comprises four stores M1 . . . M4. In FIG. 5 a void is provided between each store: G1, G2, G3. A fourth void, above store M4 yet, is not present in this case.

The portion *p*2 (points towards the next store) is at least 1, and as a module of store M2 is only twice as large as store M1, $p2 = 1$ is also sufficient. M2 comprises three modules: M21, M22, and M23, so that for $m2$ = a number of 2 bits are required. The next void G2 is at least equal to $2^{l+p2+m2+p3}(=2^{\Sigma L2+p3})$, in which $p3 = 1$. However, $p3 = 2$ is required, because a module of store M3 is four times as large as the address space thus far, i.e., $2^{l+p2+m2}(=2^{\Sigma L2})$. As there is only one module of M3, $m3 = 1$ is sufficient. Void G3 in this Figure is as large as the total pre-ceding address space comprising $2^{l+p2+m2+p3+m3} = 2^{\Sigma L3}$ addresses, because a module of store M4 is only twice as large as the address space up to this void G3. In this case $p4 = 1$ is minimum and sufficient. There is only one module of M4, so $m4 = 1$ bit suffices. The addresses at the beginning and the end of each portion of the complete storage configuration are also given in FIG. 5.

What is claimed is:

1. A computer system, comprising:

a storage configuration having at least a first store with an address space of $2^l$ possible word locations, and at least a second store consisting of $2^m-1$ modules, where $m \geq 1$, said modules together providing a second address space, said storage configuration further containing an unused address space defined as "void", between addresses of the address space of the first store, and addresses of the address space of the second store, said "void" having a capacity of $2^{l+p}-2^l$ addresses, where $p$ is at least 1, said unused address space being further determined by how many number of times larger a module of the second store is, compared to the address space $2^l$ of said first store;

a calculating unit connected to said storage configuration wherein possible word locations in said storage configuration may be calculated on the basis of at least two address components;

switching means interdeposed between said calculating unit and said storage configuration;

at least two address registers, each supplying one of said address components for calculation of the word location in said storage configuration;

detection means interdeposed between said address registers and said switching means for determining, before an address calculation is made in said calculating unit, for which of the stores a request for access is required, said determination being based upon at least a portion of at least one of said address components, said detection means after having made its determination, then supplying a relevant request signal to said switching means; and a second detection means connected to said switching means for signalling that an ultimate result of said address calculating unit is an address of said unused address space.

2. A computer system as claimed in claim 1, wherein said storage configuration has N stores, and between each of the stores I and J of the N stores, an unused address space is provided, the capacity of which is $2^{\Sigma Li+pj}-2^{\Sigma Li}$ addresses, $2^{\Sigma Li}$ being the total number of addresses of all preceding address spaces of preceding stores 1 to I, and the addresses of unused address spaces situated therebetween, *pj* being at least 1, and said unused spaces being further determined by the number of times that a module of the store J is larger than the total address space formed by the address spaces of all preceding stores and and the unused address spaces situated therebetween.

3. A computer system as claimed in claim 2, wherein another unused address space is provided above the store N, store N being of the highest order, and having a capacity $2^{\Sigma Ln+n}-2^{\Sigma Ln}$ addresses, $2^{\Sigma Ln}$ being the the total number of addresses of all preceding address spaces of the preceding stores 1 to N and the addresses of the unused address spaces situated therebetween, *n* being at least 1.

* * * * *